J. A., W. F. & I. N. Dann,

Folding Chair,

No. 1,623, Reissued Feb. 23, 1864.

Witnesses;
E. Weaton.
Rufus Sanford.

Inventors;
John A. Dann
Wm. F. Dann
Isaac N. Dann
Per John E. Earle Atty

N. PETERS, PHOTO-LITHOGRAPHER, WASHINGTON, D. C.

UNITED STATES PATENT OFFICE.

JOHN A. DANN, WILLIAM F. DANN, AND ISAAC N. DANN, OF NEW HAVEN, CONNECTICUT.

IMPROVED FOLDING-CHAIR.

Specification forming part of Letters Patent No. 37,277, dated January 6, 1863; Reissue No. 1,623, dated February 23, 1864.

*To all whom it may concern:*

Be it known that we, JOHN A. DANN, WILLIAM F. DANN, and ISAAC N. DANN, (brothers,) of New Haven, in the county of New Haven and State of Connecticut, have invented a new and Improved Folding Arm-Chair; and we do hereby declare the following to be a full, clear, and exact description of the construction and operation of the same, when taken in connection with the accompanying drawings and the letters of reference marked thereon, and which said drawings constitute a part of this specification, and represent, in—

Figure 2:
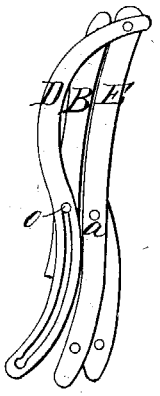
Figure 1:
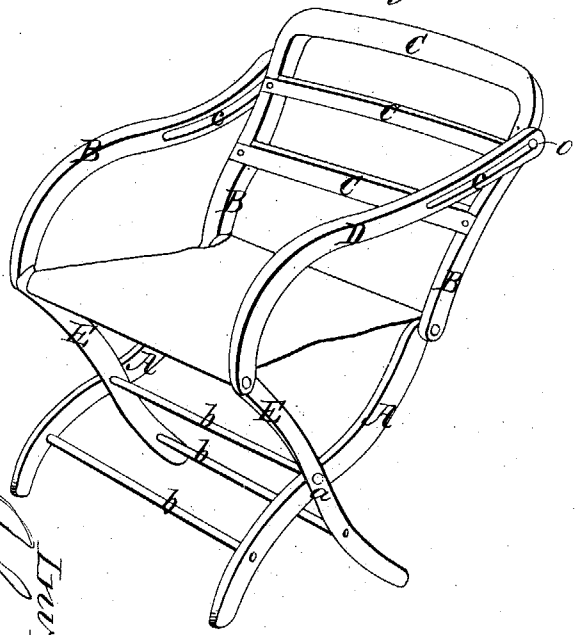

Figure 1, a perspective view of our chair set up; Fig. 2, the same chair folded, (a side view.)

Same letters and characters indicate like parts.

The object of our invention is to produce an arm-chair which may be folded into small compass, as for the purpose of transportation or for the various purposes where compactness is desirable when not in use.

Our chair is of the style known as "cross-legs," the cross being upon the sides; and our invention consists in combining bent or curved arms, each made of a single piece of wood or metal, bent or cut to the proper form, and one end of each arm jointed or pivoted to one of the legs of each pair (the front legs) and the other end attached to the back by a pivot, or in such manner that the whole may be folded into a compact form.

To enable others skilled in the art to construct and operate the folding arm-chair produced by us, we will proceed to describe the same.

We make two pairs of cross-legs, A A and E E—the former we style "the rear legs" and the latter "the front legs"—pivoted together at *a* so as to open or close freely. We give to the legs a slight curvature to add to their graceful appearance, as well as for the purpose of folding more compactly. We connect the two pairs of legs by rundles *b b*, and to form the seat we attach securely to each of the top rundles a piece of sacking or other flexible material. Thus far our chair is similar to a common and well-known camp stool. We joint or pivot to the rear legs, A A, and near the upper end of the same, two standards, B B, the two said standards united by slats C C C to form the back.

We take a piece of hickory or other suitable wood, or may be metal, and cut or bend it it form the arms, nearly as shown in Figs. 1 and 2, D D. One end of each of these curved arms D D we pivot (or connect by any known joint) to the upper end of the front legs, E E. The other or upper end of the said curved arms we connect with the standards of the back by means of any known joint, whereby the whole may be folded compactly together; but we prefer a slot or groove, *c*, Fig. 1, which slides upon a headed bolt or stud, *o*. These arms may, and we prefer to have them, serve to support the back. When thus the several parts are secured together, our chair is complete, and we have succeeded in producing an arm-chair which may be folded very compact and possessing every advantage and comfort of an ordinary arm-chair, together with those of folding-chairs.

To fold our chair, we take hold of the upper slat of the back and the rear of the seat, throw the rear of the seat forward, and at the same time press down the back and fold, as shown in Fig. 2; and when we wish to set it up, take hold of the upper slat of the back, lift the chair, and the parts will, by their own gravity, assume the position as in Fig. 1.

We are aware that the backs of folding-chairs have been supported from the front legs by means of a strap or brace from one to the other, and therefore we do not claim such support as new. Neither do we broadly claim as of our invention a folding arm-chair, as such are very common and well known, but in all cases the arm is formed of more than one piece, and the several pieces jointed or hinged together, as in the patent of S. D. Woodbury, issued March 27, 1860, or they are rigidly fixed to both leg and back standards; but, Having fully described our invention, what we do claim as new and useful, and desire to secure by Letters Patent, is—

The combination of bent or curved arms with the cross-legs of folding-chairs, when the said arms are pivoted or hinged to the two legs which sustain the front of the seat, and the other or upper end of the arms secured to the back by means of slots, whereby the several parts may be folded into a compact form without disconnecting the said curved arms from either back or legs.

JOHN A. DANN.
WM. F. DANN.
ISAAC N. DANN.

Witnesses:
J. B. JEWETT,
JOHN E. EARLE.